June 20, 1944.  F. T. COURT  2,351,807
CORN HARVESTER
Filed May 23, 1941  4 Sheets-Sheet 1

June 20, 1944.　　　F. T. COURT　　　2,351,807
CORN HARVESTER
Filed May 23, 1941　　　4 Sheets-Sheet 2
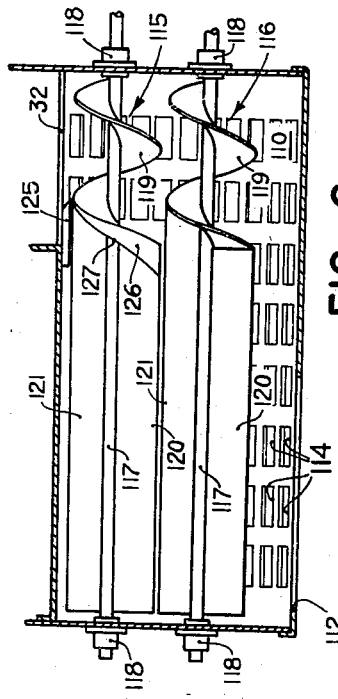
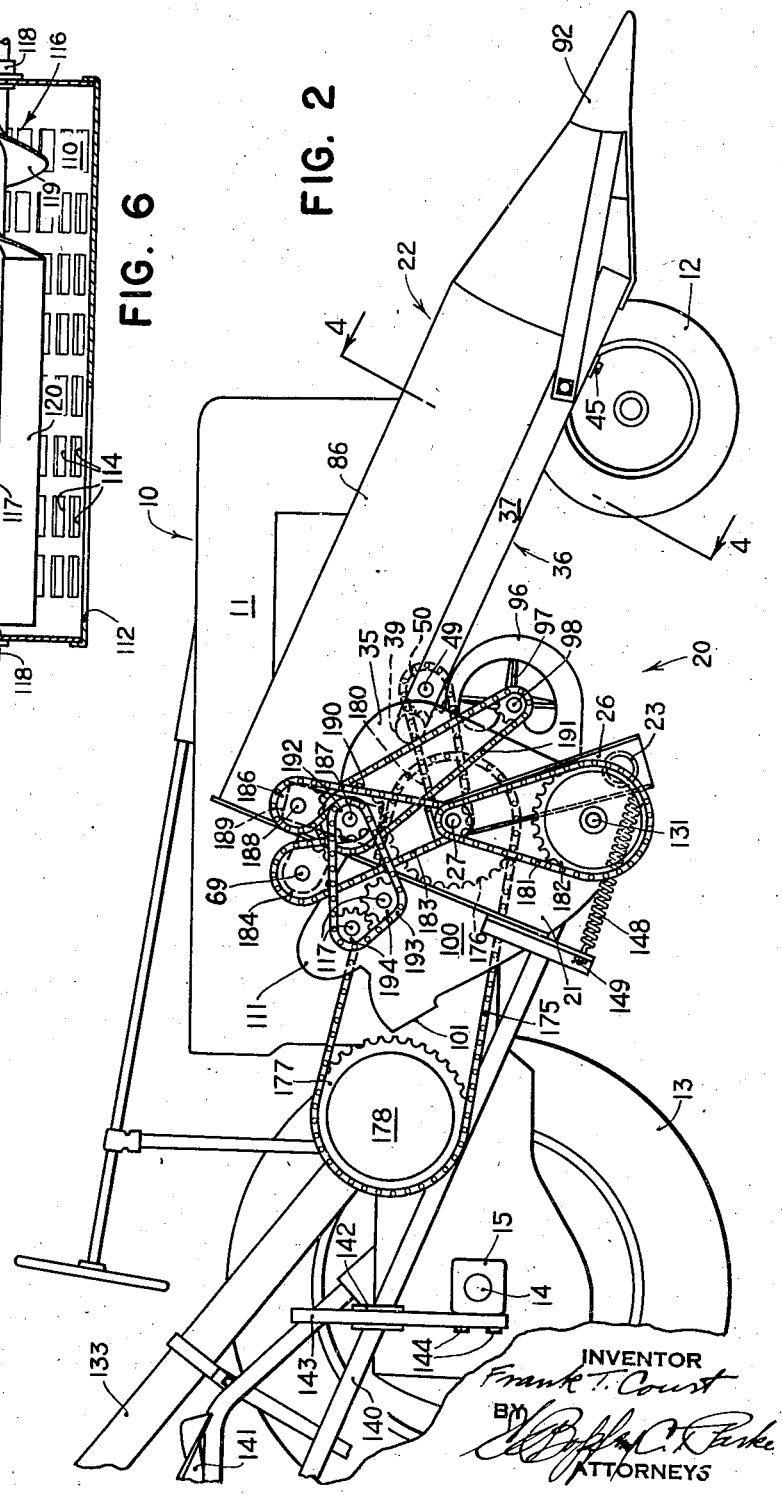

June 20, 1944.  F. T. COURT  2,351,807
CORN HARVESTER
Filed May 23, 1941  4 Sheets-Sheet 3
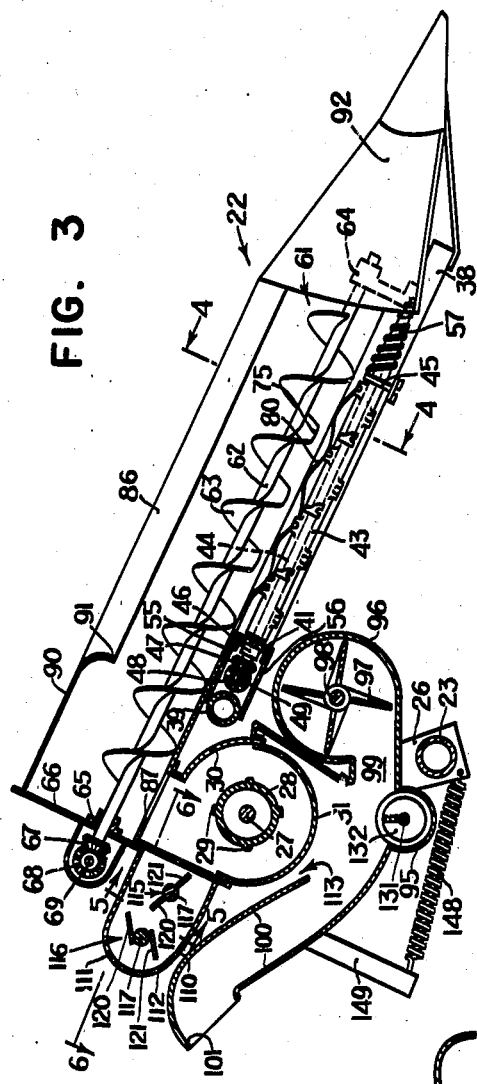
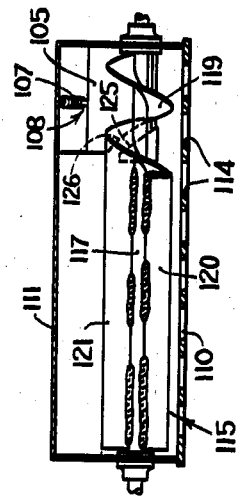
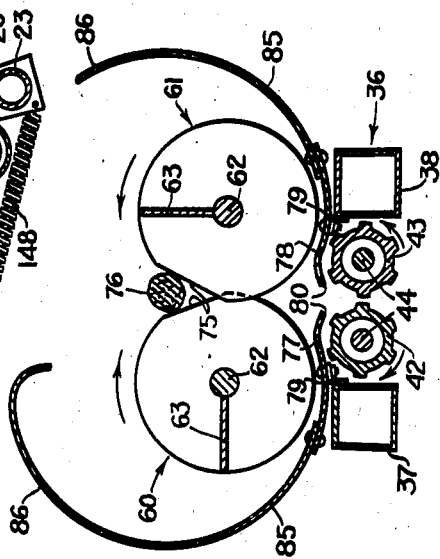
INVENTOR
Frank T. Court
BY
ATTORNEYS June 20, 1944.   F. T. COURT   2,351,807
CORN HARVESTER
Filed May 23, 1941   4 Sheets-Sheet 4
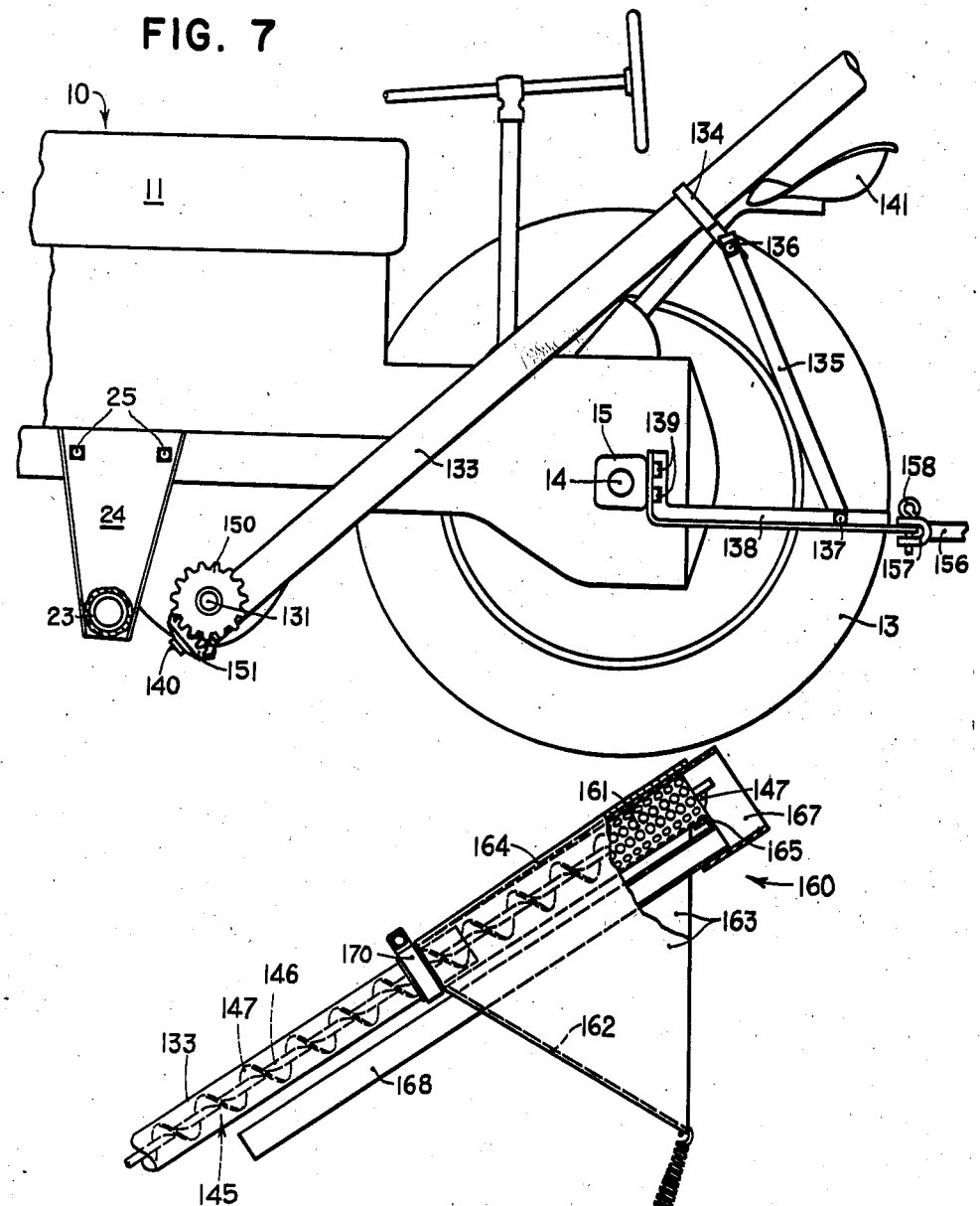
FIG. 7
FIG. 8
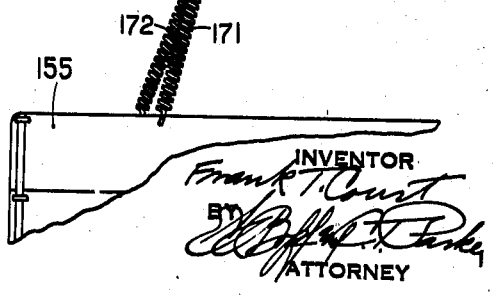
INVENTOR
Frank T. Court
BY
ATTORNEY Patented June 20, 1944

2,351,807

UNITED STATES PATENT OFFICE 2,351,807

CORN HARVESTER

Frank T. Court, Moline, Ill., assignor to Deere & Company, Moline, Ill., a corporation of Illinois Application May 23, 1941, Serial No. 394,807

17 Claims. (Cl. 56—18)

This invention relates generally to harvesting machines and more particularly to corn harvesters of the type that is mounted on the body of a tractor, and has for its principal object the provision of a novel and improved corn harvester, which is considerably lighter in weight and consequently less expensive than machines now known to those skilled in the art, but in which neither efficiency nor durability is sacrificed. In the accomplishment of this object I have provided a corn harvester of the picker sheller type in which an unusual degree of compactness and simplicity is obtained by rigidly mounting the shelling cylinder directly underneath the upper end of the gathering and picking unit in a transverse position, so that the entire machine is one unitary structure. This structure is mounted on the tractor for pivotal movement about the axis of rotation of the shelling rotor, so that vertical adjustment of the forward ends of the gatherers is obtained by rocking the entire machine about the shelling rotor axis.

Relating to the provision of a corn harvester of lighter weight, a further object of this invention has to do with the provision of a simplified gatherer unit in which the usual gatherer chains are eliminated and a single device substituted therefor, which combines the functions of gathering the stalks and also conveying the snapped ears to the rear end of the gathering unit. In the accomplishment of this object, I have provided a pair of augers disposed side by side above the snapping rolls, and having overlapping helical vanes, which cooperate to move the stalks rearwardly between the snapping rolls. The augers are disposed in longitudinally extending troughs, into which the ears of corn fall as they are snapped from the stalks, and along which the augers convey the snapped ears of corn.

A related object has to do with the provision for disposing of any cornstalks that may break off and lie along the top of the augers and between the helical blades thereof. In the accomplishment of this object, certain of the flights of the helical blades are provided with cooperative notches, which engage a cornstalk and force it downwardly between the auger blades and into engagement with the snapping rolls.

Another object of the present invention relates to the provision of a simplified framework for the gatherer unit, which also serves as an enclosure for the drive gears for the snapping rolls, requiring only a pair of upper and lower enclosure plates to complete the housing.

Still another object is concerned with the provision of means for preventing snapped ears from lying between the two snapping rolls and parallel thereto. This feature reduces the amount of corn lost at the snapping rolls by premature shelling.

Another object relates to the provision of a novel and improved cleaning and separating device, through which the shelled cobs and husks are passed after they leave the shelling cylinder, to remove any kernels that may have been discharged therewith. A related object has to do with the provision of means in the trough for actively clearing the cobs and husks away from the cob discharge opening in the shelling housing and to assist in separating the kernels of corn from the husks and trash. In the accomplishment of this object, a pair of augers are provided in the cleaning trough, for moving the trash transversely away from the cob discharge opening, after which the cobs and trash are subjected to the action of a pair of feeder blades for stirring the trash to separate therefrom any kernels of corn which may be entangled therewith. Still another related object is to provide a pair of cooperative knife blades for chopping any trash that tends to clog in the corner of the discharge opening in the sheller housing.

A further object relates to the provision of a novel and simplified grain conveyor from the grain trough in the sheller housing to a wagon or truck traveling along with the tractor for receiving the grain.

Another object relates to the provision of a final cleaner at the end of the grain conveyor, for separating any silks or other trash from the corn before the latter is discharged into the wagon.

These and other objects and advantages of my invention will be apparent to those skilled in the art after a consideration of the following description in which reference is had to the drawings appended hereto, in which Figure 1 is a plan view of a corn harvester embodying the principles of my invention, mounted on the side of a tractor;

Figure 2 is a side elevational view of the harvester and tractor;

Figure 3 is a sectional elevational view taken substantially along the longitudinal central plane of the snapping unit, as indicated by a line 3—3 in Figure 1;

Figure 4 is a sectional elevational view drawn to an enlarged scale, taken along a transverse plane passing through the snapping unit as indicated by a line 4—4 in Figure 3;

Figure 5 is a sectional elevational view drawn to an enlarged scale and taken along a line 5—5 through the cleaning unit in Figure 3;

Figure 6 is a sectional plan view of the cleaning unit, taken along a line 6—6 in Figure 3;

Figure 1:
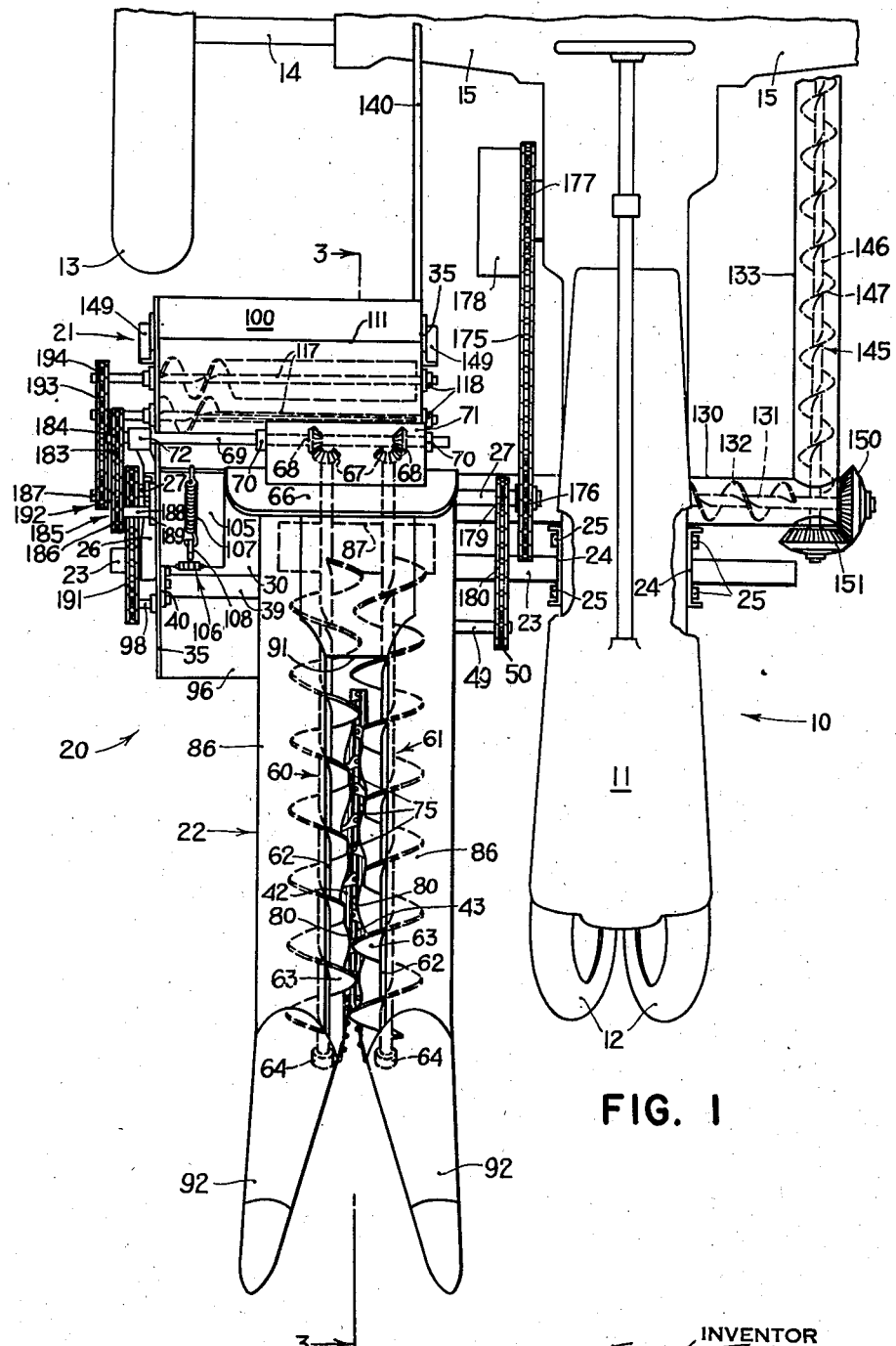

Figure 7 is an elevational view of the rear portion of the tractor, taken from the opposite side to that on which the corn harvester is mounted, and showing the details of mounting the wagon elevator; and Figure 8 is a fragmentary elevational view, drawn partly in section, showing the rear end of the wagon elevator and a portion of the wagon, and showing the details of the final cleaner at the end of the elevator.

Referring now to the drawings, the tractor, indicated generally by reference numeral 10, is of the conventional tricycle type comprising a narrow longitudinally extending body 11 mounted on a pair of closely spaced front dirigible wheels 12 and a pair of widely spaced rear traction wheels 13, one of which is shown in Figure 1. The rear traction wheels 13 are mounted in the usual manner on axles 14 journaled in a pair of laterally extending rear axle housings 15.

The corn harvester, indicated generally by reference numeral 20, comprises a transversely disposed housing 21, having a forwardly and downwardly extending gatherer unit 22 rigidly fixed thereto and forming a unitary structure therewith. The implement 20 is carried adjacent one side of the tractor body 11 intermediate thereof between the forward and rear wheels 12, 13, on a transversely disposed pipe beam 23, rigidly supported in a pair of laterally spaced supporting plates 24, secured to the sides of the tractor body by bolts 25. The supporting beam 23 extends laterally from the tractor body and carries a pair of upwardly and rearwardly extending arms 26 rigidly fixed thereto.

Journaled at opposite ends, respectively, in the upper end of the arms 26 is a transversely disposed shaft 27, which is the supporting shaft for the shelling rotor 28 (see Figure 3). The shelling rotor 28 is preferably in the form of a cylindrical drum having radially extending cob engaging lugs 29, but any conventional form of shelling rotor is intended to lie within the scope of the present invention. The shelling rotor is disposed generally coaxially with a cylindrical sheller housing 30, the lower half of which is in the form of a screen or cage 31, through which the shelled kernels of corn fall while the cobs, husks, silks and other trash are retained within the housing and pass axially therethrough to a discharge opening 32, in a manner well known to those skilled in the art. The housing 30 is supported on a pair of laterally spaced generally vertical end plates 35, which are suitably journaled on the rotor shaft 27 and rigidly fixed to the cylindrical housing 30.

The gathering and snapping unit 22 includes a longitudinally disposed supporting frame 36 comprising a pair of laterally spaced longitudinally extending tubular frame members 37, 38 of rectangular cross section, rigidly connected as by welding, at the upper end to a main transverse beam member in the form of a pipe 39, having a pair of flanges 40 at opposite ends thereof, respectively, which are rigidly fixed, as by bolting, to the end plates 35. The longitudinal frame members 37, 38 are also interconnected by means of a structural channel member 41 disposed ahead of the main supporting member 39 and rigidly fixed at opposite ends to the two frame members 37, 38. A pair of snapping rolls 42, 43, of any suitable design, are disposed between the two frame members 37, 38 and are substantially parallel thereto. Each of the snapping rolls 42, 43 is mounted on a supporting shaft 44, which is journaled near its lower end on a conventional bearing 45, fixedly mounted on the adjacent longitudinal frame member. The upper ends of the shaft 44 are journaled in a pair of bearings 46 which are supported on the transverse frame member 41, and the shafts extend behind the bearings 46 and support at their rear ends, a pair of bevel gears 47. The bevel gears 47 mesh with a pair of cooperative bevel gears 48, fixed on a transverse drive shaft 49, which is journaled in a pair of laterally spaced bearings (not shown) on the two longitudinal frame members 37, 38 and extends through the member 38 to a drive sprocket 50 at the side of the implement adjacent the tractor. Inasmuch as the diameter of the bevel gears 47, 48 are less than the vertical thickness of the frame members 37, 38 and the transverse members 39, 41, the frame members serve to enclose the gears on four sides and require only a pair of upper and lower enclosure plates 55, 56 to form a complete gear housing, as is evident in Figure 3. The gears 47, 48 are arranged to drive the snapping rolls 42, 43 in opposite directions of rotation, as indicated by the arrows in Figure 4, to pull cornstalks downwardly therebetween and snap the ears therefrom in a well-known manner. The forward ends of the snapping rolls 57 are tapered in a customary manner to receive therebetween the cornstalks as the implement advances in the field.

A pair of auger conveyors 60, 61 are disposed above the snapping rolls 42, 43 in generally parallel relation thereto and to each other, and comprises a pair of parallel shafts 62, on each of which is wound a helical blade 63. The shafts 62 are journaled at their lower ends in suitable journal bearings 64 supported on the forward ends of the frame members 37, 38, respectively, and another pair of journal bearings 65 mounted on the back sheet 66 of the housing. The shafts 62 are spaced laterally a distance less than the diameter of the helical blade 63, and therefore the blades of the augers overlap to a certain extent in order to serve in lieu of gatherer chains to move the cornstalks rearwardly between the snapping rolls. The auger blades 63 of the two augers are wound with the same pitch but in reverse direction. That is to say, the blade 63 of the left-hand auger 60 is wound as a left-hand screw while the blade 63 on the right-hand auger 61 is wound as a right-hand screw, with the result that when the two augers are turned in opposite directions, both of the blades 63 have a rearwardly propelling effect upon the cornstalks. The augers are rotated in opposite directions and at the same speed of rotation, by means of a pair of beveled gears 67, mounted on the rear ends of the shafts 62 behind the back sheet 66. Gears 67 are disposed in mesh with a pair of bevel driving gears 68, mounted in opposed relation upon a transverse drive shaft 69, journaled in laterally spaced bearings 70 in an extension housing 71 fixed to the back plate 66. An outboard bearing 72 is attached to the housing 30 and supports the outer end of shaft 69.

It frequently occurs that a cornstalk will break off above the augers 60, 61 and lie upon the overlapping blades 63. In order to get rid of these broken stalks before they are carried rearwardly into the sheller cage, several of the turns of each of the blades 63 at the intermediate portion of the augers are trimmed off, as indicated in Figure 4, at 75. These cut-away portions 75 of the two blades are timed to receive between them a cornstalk, as indicated at 76, and since the rotation of the blades 63 is such that the inside edges thereof move downwardly, the cornstalks are engaged by the cut-away portions 75 and forced downwardly below the augers into engagement with the snapping rolls. Without these cut-away portions, I have found that many pieces of broken cornstalks which fall on top of the augers 60, 61 are conveyed rearwardly and tend to clog the shelling cage, but I have found that the above described device is very effective in disposing of the cornstalks and preventing them from being conveyed into the cage.

A pair of guard plates 77, 78 are disposed between the snapping rolls 42, 43 and the augers 60, 61, respectively. The guard plates 77, 78 extend longitudinally of the picking unit and lie on the tops of the longitudinal frame members 37, 38, respectively, and are fixed thereto by a series of clips 79. Each of the guard plates extends inwardly over its adjacent snapping roll, curving over the latter in closely spaced relation thereto, and terminates in a longitudinally extending inner edge that is preferably sinuous in form. The inner edges of the two plates 77, 78 define a sinuous slot therebetween, which is generally in register with the space between the snapping rolls and substantially of uniform width. The guard plates 77, 78 effectively prevent ears of corn from being caught between the two snapping rolls after having been snapped from the stalks and then being forced through the rolls or shelled by the lugs on the snapping rolls. By making the slot 80 sinuous or zig-zag in form, with the curves of the slot shorter than the length of an average ear of corn, the latter do not tend to lie longitudinally within the slot and slide rearwardly therein, but are held up in a position in which the ears can be engaged by the blades 63 and thrown outwardly on either side of the snapping rolls into one of a pair of troughs 85.

The troughs 85 are formed by a pair of sheet metal side walls 86 which extend longitudinally of the frame members 37, 38 and curve outwardly and upwardly over the augers 60, 61. The longitudinally extending lower edge of each of the side walls 86 is securely attached to the outer edges of the plates 77, 78, respectively. Since the augers 60, 61 lie longitudinally within the rearwardly extending troughs 85, the augers act not only as gatherers for the cornstalks but also as conveyors for the ears of corn, and engage the latter within the troughs 85 to move them rearwardly to an aperture 87 in the bottom of the troughs 85 and at the rear ends thereof, and through which the ears drop into the sheller housing 30, as best indicated in Figures 1 and 3.

The upper ends of the augers 60, 61 are covered by an overhanging sheet metal roof 90 having a downwardly curved forward end 91 disposed approximately above the upper ends of the snapping rolls and against which stalks may slide as they are drawn downwardly through the snapping rolls.

On the forward end of each of the side walls 86 is supported a gatherer point 92, which can be of any suitable shape, for the purpose of lifting lodged stalks from the ground to permit them to be acted upon by the snapping rolls.

The ears of corn are introduced into the shelling cylinder at the inner end of the latter through the feeder opening 87 and are propelled axially outwardly through the cage by the action of the shelling beater 28 in a well-known manner. The kernels are shelled from the cobs by the action of the ears rubbing against each other and the shelled kernels drop downwardly through the cage 31 and are collected in a conveyor trough 95 that extends beneath the cage 31 and generally parallel to the axis thereof. A fan housing 96 is supported on the shelling housing 30 immediately ahead of the latter, and disposed within the housing 96 is a fan rotor 97 mounted on a shaft 98. The fan housing 96 has a discharge outlet 99, which directs a blast of air rearwardly beneath the shelling cage 31 and substantially perpendicular to the axis of the latter. Thus, as the corn falls into the trough 95, it is subjected to the blast of air from the fan, which removes dirt, silks, or other trash that fall from the cage, and the latter are carried by the air blast rearwardly through a discharge duct 100 having a downwardly turned dischaged aperture 101 at the rear end thereof, for discharging the trash to the ground at the side of the tractor.

The outer end of the cylindrical shelling housing 30 is provided with a cob discharge opening 32, through which the cobs and husks are forced in a radial direction out of the cage against the action of a cob gate 105, in the form of a cylindrically curved sheet pivotally mounted by means of a hinge 106 at its forward edge. The gate 105 is yieldingly urged toward a closed position by means of a coil spring 107 connected to an arm 108 fixed to the top of the cob gate 105 and anchored at a suitable point on the housing. The cob gate retards the movement of the cobs and husks out of the shelling cage in a manner well-known to those skilled in the art and insures that the cobs are sufficiently shelled before they are discharged.

The cobs, husks and silks are discharged into a perforated cleaning trough 110, which extends transversely behind the shelling cage and substantially parallel to the axis of the latter. The trough 110 forms the lower part of a housing having a roof 111, for preventing the trash from blowing out of the trough before it is properly cleaned. The trash passes axially through the trough and is discharged from an aperture 112 in the rear thereof adjacent the inner end of the housing. Any shelled kernels of corn which may be carried out of the shelling cage with the trash, pass through perforations 114 in the cleaning trough 110 and drop upon the top wall of the air discharge duct 100, over which they slide forwardly into the trough 95. The top of the discharge duct 100 is spaced below the shelling cage 31 to provide a slot 113 to allow the passage of the kernels.

The trash and cobs are moved longitudinally through the cleaning trough 110 from the entrance opening 32 to the discharge opening 112 by means of a pair of beaters 115, 116 arranged longitudinally in the trough 110 and each comprising a supporting shaft 117, journaled in bearings 118 in opposite end walls of the cleaning trough. A helical blade 119 is wound upon each of the shafts 117 directly behind the opening 32 and terminating at a point behind the inner edge of the opening 32. The inner end of each of the helical blades 119 is connected to the end of a straight blade 120, forming a continuation thereof and extending axially to the opposite end wall of the cleaning trough. A second axially extending straight blade 121 is fixed to each of the shafts 117 opposite the straight blade 120, and this second blade 121 extends outwardly along the shaft until it abuts the helical blade 119. The two helical blades 119 are both wound in the same direction and the shafts 117 are turned in the same direction of rotation and consequently, the cobs and trash are quickly moved by the blades away from in front of the opening 32 to clear the latter and thus to prevent clogging in the opening.

In order to prevent stalks and long leaves and husks from hanging over the inner edge of the opening 32, a knife blade 125 is disposed diagonally across the inner lower corner of the opening as indicated in Figures 5 and 6. Long stalks and leaves which are moved transversely across the opening by the blade 119 of the forward beater 115, are dragged over the sharp edge of the knife 25 and are cut off. In order to provide a positive shearing action, a knife blade section 126 is provided on the forward beater 115. This knife section 126 is in the form of a generally triangular blade curved cylindrically to follow the outer edge of the blade 119 to its point of termination with the straight blade 120 and having a helically formed knife edge 127 adapted to cooperate with the knife blade 125 in a shearing contact therewith.

Attached to the inner end of the grain trough 95 and forming a continuation thereof, is a conveyor tube 130, which is rigidly attached to the inner end plate 35 of the housing of the harvesting implement and extends transversely under the body 11 of the tractor 10, and is swingable therewith about the axis of the cylinder shaft 27. A screw conveyor, including a shaft 131 and helical blade 132, is disposed axially within the trough 95 and tube 130 and moves the kernels of corn from the trough to the end of the tube 130, which terminates adjacent the opposite side of the tractor body 11. At this point the tube 130 is connected in communication with the lower end of an upwardly and rearwardly inclined elevator tube 133, which is supported on a bracket 134, swingably connected to a supporting link 135 by a transverse pivot bolt 136. The lower end of the link 135 is pivotally connected by a bolt 137 to a draft frame 138, which is fixed by bolts 139 to the rear side of the tractor axle housing 15.

Since the supporting link 135 is free to pivot about the bolts 136, 137, the elevator tube 133 can move fore and aft as the corn harvester is swung about the axis of the shaft 27 to raise and lower the gatherer points 92. This swinging adjustment is accomplished by means of a hand-actuated lever 140, which is rigidly fixed to the body of the housing 30 and extends upwardly and rearwardly therefrom to a position convenient to the operator of the tractor on the tractor seat 141. The implement is held in adjusted position by means of any suitable detent mechanism 142, such as, for example, a notched sector mounted on a rigid post 143 fixed to the tractor axle housing 15 by bolts 144. The harvester is counterbalanced by a pair of laterally spaced springs 148 connected between arms 149 fixed to the housing and the lower ends of the arms 26.

Disposed within the elevator tube 133 is a screw conveyor 145 including a shaft 146 on which is wound a suitable helical blade 147. The lower end of the elevator tube 133 intersects the end of the transverse conveyor tube 130, but the axes of the two tubes 130, 133 are slightly offset to permit the two shafts 131, 146 to cross each other. The ends of the shafts are journaled in suitable bearings in the ends of the tubes 130, 133 and project therethrough to support a pair of bevel gears 150, 151, which gears mesh together in a slightly offset arrangement due to the shafts 131, 146 being crossed, and thus the elevator shaft 146 is driven through the intermeshing gears 150, 151, from the transverse conveyor shaft 131. The kernels of corn are conveyed from the trough 95 through the tube 130 and drop into the inclined conveyor tube 133, from which they are conveyed upwardly and rearwardly over the tractor axle 15 to a point of discharge at the rear end of the tube into a suitable wagon or trailer indicated at 155 in Figure 8. The wagon is provided with a suitable draft member 156 (see Figure 7) having a clevis 157 which is connected with the draft frame 138 by means of a pin 158.

A final cleaner 160 is provided at the upper rear end of the elevator tube 133 for the purpose of separating any cob ends or silks from the corn before it is discharged into the wagon. This cleaner includes a tubular screen member 161 fixed at the end of the tube 133 and forming a continuation thereof, the screen 161 being provided with apertures of a sufficient size to pass the kernels of corn therethrough but to retain any cob ends, silks or leaves or other trash. The kernels of corn fall through the apertures in the screen 161 into an inclined chute 162, having a pair of sheet metal side walls 163 that are joined together by a curved portion 164, which lies over the top of the screen 161 and supports the chute therefrom, permitting the latter to swing laterally about the axis of the screen 161. A collar 165 embraces the upper end of the screen 161 and extends upwardly beyond the end of the screen 161 and is connected by means of a passage 167 to a tube 168, which extends forwardly and downwardly parallel to the elevator tube 133 between the side walls 163 of the chute 162 and extends through a suitable aperture in the latter, within which the tube 168 is supported. The tube 168 is long enough to extend forwardly over the forward end of the wagon 155. The trash does not pass through the screen 161 but is carried by the auger blade 147 beyond the upper end of the screen 161 where the trash drops through the passage 167 into the upper end of the tube 168. It then slides forwardly and downwardly through the tube 168 and drops to the ground ahead of the wagon 155. It will be noted that the diameter of the tube 168 is less than the diameter of the tube 133 and thereby provides space between the side walls 163 for the kernels of corn to drop on either side of the tube 168 to the spout 162. The spout 162, side walls 163 and tube 168 are all a part of a unitary sheet metal member which is swingable about the axis of the tube 133 but is prevented from sliding downwardly on the latter by means of a clamp member 170. The lower end of the spout 162 is connected by a pair of springs 171, 172 to the opposite side walls of the wagon 155, and thus when the tractor makes a right or left turn, the spout 162 is swung relative to the elevator tube 133 to hold the lower end thereof over the wagon and prevent kernels of corn from being spilled on the ground during a turn. Inasmuch as there is a considerable lag between the time the ears are fed into the shelling cage and the time the kernels are discharged into the wagon, it will be evident that there will be no cessation in the stream of corn flowing into the wagon during the turn and it is therefore important that the end of the spout 162 should not be swung laterally out of register with the wagon box during a turn.

Power for operating the entire harvesting implement is supplied by a drive chain 175 which connects a main drive sprocket 176 on the inner end of the cylinder shaft 27 with a detachable sprocket 177 which is suitably mounted on the belt pulley 178 of the tractor. Adjacent to the drive sprocket 176 on the cylinder shaft 27 is a sprocket 179, which drives the sprocket 50 on the snapping roll drive shaft 49 through a chain 180. The shaft 131 of the transverse conveyor is driven from the shelling rotor shaft 27 by means of a chain 181 trained around a sprocket 182. The gathering augers 60, 61 are driven through the shaft 69 by means of a chain 183 trained around a sprocket 184 on the outer end of the shaft 69. The chain 183 is also trained around a pair of sprockets 185, 186 mounted on a pair of idler shafts 187, 188, respectively, which are fixed to a mounting plate 189 rigidly fixed to the end plate 35. It will be noted that the chain 183 is trained around the sprocket 185 to drive the latter in the opposite direction to that of the shelling rotor shaft 27. A second sprocket 190 is mounted on the shaft 187 and drives the fan shaft 98 through a chain 191, also in the opposite direction of rotation to that of the shelling rotor. A third sprocket 192 on the outer end of the shaft 187 drives the two beater shafts 117 through a chain 193 trained around a pair of sprockets 194 on the shafts 117.

I claim:

1. A harvester, comprising in combination, a tractor having a rear axle, a frame supported on one side of said tractor, a crop treating cylinder disposed transversely on said frame ahead of said rear axle, a crop gathering means supported on said frame and extending forwardly therefrom, a tarnsversely disposed grain trough beneath said cylinder, conveyor means extending from said trough transversely under the tractor, and means on the opposite side of the tractor for raising the grain for discharge into a wagon associated with the tractor.

2. A harvester, comprising in combination, a tractor having a narrow body carried on laterally extending rear axles, a frame supported on one side of said tractor, a crop treating cylinder disposed transversely on said frame ahead of the rear axle on that side, a crop gathering means supported on said frame and extending forwardly therefrom, a screw conveyor beneath said cylinder and extending parallel thereto under the tractor, and elevator means on the opposite side of said tractor for raising the grain for discharge into a wagon associated with the tractor.

3. A harvester, comprising in combination, a tractor, a rigid frame supported on one side of the tractor ahead of the rear wheels by means providing for swinging movement about a transverse axis, a cylinder disposed transversely on said frame, a crop gatherer mounted rigidly on the frame, a grain trough under said cylinder generally parallel thereto, and a conveyor in said grain trough and extending laterally under the tractor to discharge the grain on the opposite side thereof.

4. A harvester comprising in combination, a tractor having a longitudinally extending body supported on laterally spaced rear traction wheels and front dirigible wheels, a frame extending rigidly laterally from the side of the tractor body between the front and rear wheels, a housing swingably mounted on said frame by means providing for movement about a transverse axis, a crop treating cylinder including a rotor mounted in said housing for rotation about a transverse axis, a crop gatherer mounted rigidly relative to said housing and swingable therewith, and manually controlled means for tilting said housing to raise and lower said gatherer.

5. A harvester comprising in combination, a tractor having a longitudinally extending body supported on laterally spaced rear traction wheels and front dirigible wheels, a frame extending rigidly laterally from the side of the tractor body between the front and rear wheels, a housing swingably mounted on said frame by means providing for movement about a transverse axis, a corn shelling cylinder including a rotor mounted in said housing for rotation about a transverse axis, snapping mechanism mounted rigidly relative to said housing and swingable therewith, a fan mounted under said snapping mechanism and including a rotor journaled on a transverse axis and means for directing an air blast rearwardly under said shelling cylinder, a transverse trough under said cylinder for receiving corn therefrom, a transverse trough behind said cylinder for receiving cobs and husks therefrom, said trough being perforated to permit kernels to fall into said corn receiving trough, and an auger in said perforated trough for moving said cobs and husks therein to discharge the same at one end thereof.

6. A harvester comprising in combination, a tractor, gathering and cleaning mechanism mounted on one side of the tractor body ahead of the rear wheels thereof, a grain trough beneath said cleaning mechanism, an auger conveyor extending from said trough transversely beneath the tractor, and a second auger conveyor on the opposite side of the tractor extending upwardly and rearwardly and connected at its forward end to said transverse auger conveyor to receive grain therefrom.

7. A harvester comprising in combination, a tractor having a longitudinally extending body supported on laterally extending rear axle housings, a crop gathering device mounted on one side of said body ahead of one of said axle housings, and means for conveying grain from said device to a wagon at the rear of said tractor, including a conveyor tube supported transversely beneath the tractor body, a second conveyor tube disposed substantially longitudinally of said tractor body and connected at its forward end with said transverse tube to receive grain therefrom, a shaft rotatable in each tube and having a helical flight wound thereon for moving grain in said tubes, said transverse and longitudinal tubes having their axes slightly offset to permit their shafts to cross each other, means for driving one of said shafts, and means comprising a pair of intermeshing bevel gears fixed to the ends of said shafts, respectively, for transmitting power to the other shaft.

8. A harvester comprising in combination, a tractor, an implement housing mounted on said tractor intermediate the front and rear ends thereof by means providing for swinging movement about a transversely extending axis, a first auger conveyor including a tubular housing rigidly mounted on said housing and extending laterally therefrom, a second auger conveyor including a housing rigidly mounted at the end of said first housing and extending longitudinally of the tractor, and link means for flexibly supporting the other end of said second conveyor on said tractor to accommodate said swinging movement of the housing.

9. A harvester comprising in combination, a tractor having a longitudinally extending body supported on laterally extending rear axle housings, a crop gathering device mounted on one side of said body by means providing for swinging movement about a transverse axis, a first auger conveyor having a tubular housing rigidly mounted on said gathering device for receiving crops therefrom and extending laterally under said tractor body, a second auger conveyor having a tubular housing rigidly fixed at its front end to said first conveyor housing and extending rearwardly therefrom along the opposite side of said body, and flexible means for supporting the rear end of said second conveyor housing on one of the rear axle housings and adapted to accommodate the swinging movement of said device.

10. A harvester comprising in combination, a tractor having a longitudinally extending body supported on laterally extending rear axle housings, a crop gathering device mounted on one side of said body by means providing for swinging movement about a transverse axis, a first auger conveyor having a tubular housing rigidly mounted on said gathering device for receiving crops therefrom and extending laterally under said tractor body, a second auger conveyor having a tubular housing rigidly fixed at its front end to said first conveyor housing and extending rearwardly therefrom along the opposite side of said body, a shaft rotatable in each of said tubular housings and having a helical flight wound thereon for conveying crops in tubular housings, said tubular housings being slightly offset to permit said shafts to cross each other, means in said gathering device for driving the shaft of said first auger conveyor, a pair of intermeshing bevel gears fixed to the ends of said shafts, respectively, for transmitting power to the shaft of said second auger, and link means for swingably supporting said second conveyor housing on one of the rear axle housings of the tractor.

11. A harvester comprising in combination, a tractor having a narrow body carried on a laterally extending rear axle housing, a frame supported on one side of said tractor, a corn shelling cylinder including a rotor disposed transversely on said frame ahead of said axle housing, a trough disposed beneath said cylinder and parallel thereto to receive shelled kernels therefrom, conveyor means extending from said trough transversely under the tractor, and elevator means on the opposite side of the tractor for raising the grain into a wagon or the like.

12. A harvester comprising in combination, a tractor having a narrow body carried on a laterally extending rear axle housing, a frame supported on one side of said tractor, a corn shelling cylinder including a rotor disposed transversely on said frame ahead of said axle housing, a trough disposed beneath said cylinder and parallel thereto to receive shelled kernels therefrom, an auger in said trough and extending from said trough transversely under the tractor, a conveyor tube connected with the end of said trough through which said auger extends, a second conveyor tube attached to said tube on the opposite side of said tractor and extending upwardly and rearwardly over the rear axle of said tractor, and a second auger operatively associated with said second tube for moving shelled corn therein to a wagon or the like.

13. A harvester comprising in combination, a tractor having a longitudinally extending body supported on laterally spaced rear traction wheels and front dirigible wheels, a frame extending rigidly laterally from the side of the tractor body between the front and rear wheels, a housing swingably mounted on said frame by means providing for movement about a transverse axis, a corn shelling cylinder including a rotor mounted in said housing for rotation about a transverse axis, snapping mechanism mounted rigidly relative to said housing and swingable therewith, a transverse trough under said cylinder for receiving shelled corn therefrom, conveyor means extending from said trough transversely under the tractor, and elevator means on the opposite side of the tractor for raising the grain into a wagon or the like.

14. A harvester comprising in combination, a tractor having a longitudinally extending body supported on laterally spaced rear traction wheels and front dirigible wheels, a frame extending rigidly laterally from the side of the tractor body between the front and rear wheels, a housing swingably mounted on said frame by means providing for movement about a transverse axis, a corn shelling cylinder including a rotor mounted in said housing for rotation about a transverse axis, snapping mechanism mounted rigidly relative to said housing and swingable therewith, a trough disposed beneath said cylinder and parallel thereto to receive shelled kernels therefrom, an auger in said trough and extending from said trough transversely under the tractor, a conveyor tube connected with the end of said trough through which said auger extends, a second conveyor tube attached to said tube on the opposite side of said tractor and extending upwardly and rearwardly over the rear axle of said tractor, and a second auger operatively associated with said second tube for moving shelled corn therein to a wagon or the like.

15. A harvester comprising in combination, a tractor having a longitudinally extending body supported on laterally spaced rear traction wheels and front dirigible wheels and an engine driven pulley disposed on one side of said body and rotatable about a transverse axis, a frame extending rigidly from the side of the tractor body, a housing swingably mounted on said frame by means providing for movement about a transverse axis, a crop treating rotor journaled in said housing on said axis, a flexible endless power transmitting member trained over said pulley and the shaft of said rotor for driving the latter, and conveyor means extending from said housing beneath the tractor for conveying crops and having a connection to said rotor to be driven therefrom.

16. A harvester comprising in combination, a tractor having a longitudinally extending body supported on laterally spaced rear traction wheels and front dirigible wheels and an engine driven pulley disposed on one side of said body and rotatable about a transverse axis, a frame extending rigidly from the side of the tractor body, a housing swingably mounted on said frame by means providing for movement about a transverse axis, a corn shelling cylinder including a rotor journaled in said housing for rotation about said axis, a flexible endless power transmitting member trained over said pulley and the shaft of said rotor for driving the latter, a trough disposed beneath said cylinder and parallel thereto to receive shelled kernels therefrom, an auger in said trough and extending from said trough transversely under the tractor, a conveyor tube connected with the end of said trough through which said auger extends, a second conveyor tube attached to said tube on the opposite side of said tractor and extending upwardly and rearwardly over the rear axle of said tractor, and a second auger operatively associated with said second tube for moving shell corn therein to a wagon or the like.

17. A harvester comprising in combination, a tractor having a longitudinally extending body supported on laterally spaced rear traction wheels and front dirigible wheels and an engine driven pulley disposed on one side of said body and rotatable about a transverse axis, a frame extending rigidly from the side of the tractor body, a housing swingably mounted on said frame by means providing for movement about a transverse axis, a corn shelling cylinder including a rotor journaled in said housing for rotation about said axis, a flexible endless power transmitting member trained over said pulley and the shaft of said rotor for driving the latter, a trough disposed beneath said cylinder and parallel thereto to receive shelled kernels therefrom, an auger in said trough and extending therefrom transversely under the tractor, a conveyor tube extending from the end of said trough, rigid with said housing and swingable therewith about the axis of said rotor, said auger extending through said conveyor tube, a second conveyor tube attached to and supported on said tube on the opposite side of said tractor, and extending upwardly and rearwardly over the rear axle of said tractor, a second auger operatively associated with said second tube for raising shelled corn therein, and movable means supporting the upper end of said second tube on said tractor and adapted to accommodate swinging movement of said second tube when said housing is rocked about the axis of said shelling rotor.

FRANK T. COURT.